US012627876B2

(12) United States Patent　　(10) Patent No.:　US 12,627,876 B2
Nakatogawa et al.　　(45) Date of Patent:　May 12, 2026

(54) IMAGING DEVICE

(71) Applicant: Japan Display Inc., Tokyo (JP)

(72) Inventors: Hirondo Nakatogawa, Tokyo (JP);
Yoshiro Aoki, Tokyo (JP); Hitoshi Tanaka, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 81 days.

(21) Appl. No.: 18/827,868

(22) Filed: Sep. 9, 2024

(65) Prior Publication Data

US 2025/0097557 A1　　Mar. 20, 2025

(30) Foreign Application Priority Data

Sep. 20, 2023　(JP) ................................. 2023-152255

(51) Int. Cl.
H04N 23/55　　(2023.01)
G02F 1/1335　　(2006.01)
G02F 1/1339　　(2006.01)
G02F 1/1343　　(2006.01)
H04N 13/211　　(2018.01)

(52) U.S. Cl.
CPC ....... H04N 23/55 (2023.01); G02F 1/133512 (2013.01); G02F 1/13398 (2021.01); G02F 1/134309 (2013.01); H04N 13/211 (2018.05)

(58) Field of Classification Search
CPC ............................ H04N 13/211; H04N 23/55; G02F 1/133512; G02F 1/13398; G02F 1/134309
See application file for complete search history.

(56) References Cited

U.S. PATENT DOCUMENTS

| | | | | |
|---|---|---|---|---|
| 7,923,677 B2 * | 4/2011 | Slinger | ................... | G01T 1/295 |
| | | | | 250/363.06 |
| 2021/0080770 A1 * | 3/2021 | Jin | ....................... | G02F 1/13394 |
| 2023/0236454 A1 * | 7/2023 | Igeta | ..................... | H04N 23/95 |
| | | | | 349/158 |
| 2025/0068010 A1 * | 2/2025 | Igeta | ................... | G02F 1/13394 |

OTHER PUBLICATIONS

Levin et al., "Image and Depth from a Conventional Camera with a Coded Aperture", Massachusetts Institute of Technology, Computer Science and Artificial Intelligence Laboratory, vol. 26, No. 3, Jul. 29, 2007, 9 pages.
Zhou et al., "Coded Aperture Pairs for Depth from Defocus and Defocus Deblurring", International Journal of Computer Vision, vol. 93, Dec. 3, 2010, pp. 1-17.

* cited by examiner

*Primary Examiner* — Lin Ye
*Assistant Examiner* — Chriss S Yoder, III
(74) *Attorney, Agent, or Firm* — XSENSUS LLP

(57) ABSTRACT

An imaging device having a lens, an optical sensor and an aperture placed close to the lens, the aperture is constituted by a liquid crystal aperture, which has a first substrate, a second substrate and a liquid crystal layer therebetween; a lower layer electrode, an interlayer insulating layer, and an upper layer electrode are formed in this order on the first substrate; the upper layer electrode having a first electrode, which is formed in an area which includes a center of the pattern area, and a second electrode disposed from the first electrode with a space, a columnar spacer is formed between the first electrode and the second substrate in a plan view.

12 Claims, 14 Drawing Sheets

Levin

Coded pair
(Zhou)

IMAGING DEVICE

CROSS-REFERENCE TO RELATED APPLICATION

The present application claims priority from Japanese Patent Application JP 2023-152255 filed on Sep. 20, 2023, the content of which is hereby incorporated by reference into this application.

BACKGROUND OF THE INVENTION

(1) Field of the Invention

This invention relates to an imaging device using the encoded imaging method.

(2) Background Technology

Imaging with a camera is a process of capturing a two-dimensional image from the three-dimensional world. In an ordinary camera, the image at the focal point is clear, however as the camera moves away from the focal point, the image becomes blurred.

On the other hand, there is a demand for all-image display, which can display a clear image on the entire screen, or to obtain a three-dimensional image. To realize such a demand, information on the distance between each position of the object to be imaged and the lens is required.

Non-Patent Document 1 describes a technique to measure and calculate distance information along with camera capture using a specially shaped encoding aperture. Non-Patent Document 2 describes a technique that uses a pair of patterns as the encoding aperture, one is a pattern used to counteract image blurring and the other is a pattern used to acquire distance information.

PRIOR ART REFERENCES

Non-Patent Documents

[Non-Patent Document 1] Image and Depth from a Conventional Camera with a Coded Aperture Anat Levin Rob Fergus et al.
[Non-Patent Document 2] Coded Aperture Pairs for Depth from Defocus and Defocus Deblurring Changyin Zhou Stephen Lin Shree K. Nayar

SUMMARY OF THE INVENTION

As an imaging technique for measuring the distance from the lens to the subject and obtaining distance data to form a three-dimensional image or all-in-focus image simply by taking a picture, there is a method of taking a picture using a specially shaped aperture pattern (hereinafter referred to as "encoded aperture pattern"). In other words, this method enables to measure the distance from the lens to the pixel to be calculated by shooting with this encoded aperture pattern.

If this encoding aperture pattern is composed of liquid crystal, the degree of freedom of pattern formation can be increased. In this document, this is also referred to as liquid crystal aperture (LC aperture). The LC aperture has a feature of being much smaller in size than a normal liquid crystal display (LCD). In addition, color images and gray displays are not required; only black and white displays are needed. Instead, a clear difference between the white and black displays is required. In other words, a large contrast is needed between the display and the black display.

The task of the present invention is to realize such a liquid crystal aperture suitable for forming encoded aperture patterns.

The present invention solves the above problem and the main specific measures are as follows.

(1) An imaging device having a lens, an optical sensor that receives light, and an aperture placed close to the lens and between the lens and an object to be imaged; the aperture being constituted by a liquid crystal aperture in which a liquid crystal layer is sandwiched between a first substrate and a second substrate, a pattern area, and a peripheral light shielding frame; a lower layer electrode, an interlayer insulating layer, and an upper layer electrode being formed in this order on the first substrate, the upper layer electrode having a first electrode, which is formed in an area which includes a center of the pattern area, and a second electrode disposed from the first electrode with a space, in which the space and the lower layer electrode overlap in a plan view, a first light shielding film constituting the peripheral light shielding frame is formed in a periphery of the second substrate, a first columnar spacer is formed between the first light shielding film and the first substrate in a plan view, and a second columnar spacer is formed between the first electrode and the second substrate in a plan view.

(2) The imaging device according to (1), a common electrode is formed on the second substrate, and liquid crystal molecules are driven by electric field formed between the upper layer electrode and the common electrode when a first pattern is formed in the pattern area.

(3) The imaging device according to (1), a common electrode is formed on the second substrate, and liquid crystal molecules are driven by electric field formed between the lower layer electrode and the common electrode when a second pattern is formed in the pattern area.

(4) An imaging device having a lens, an optical sensor that receives light, and an aperture placed close to the lens and placed between the lens and an object to be imaged, an outer shape of the aperture being rectangular, the aperture being constituted by a liquid crystal aperture in which a liquid crystal layer is sandwiched between a first substrate and a second substrate, a pattern area, and a peripheral light shielding frame, in which the pattern area is a pentagon or larger polygon or circle, in the pattern area, scanning lines extend in a first direction and are arranged in a second direction, video signal lines extend in the second direction and are arranged in the first direction, a pixel is formed in a region surrounded by the scanning lines and the video signal lines, a pitch of the pixel in the first direction is 30 μm or less, and a pitch of the pixel in the second direction is 30 μm or less; in the pattern area, a columnar spacer, which determines a distance between the first substrate and the second substrate, is formed in a first area which includes a center of the pattern area, and in the first direction, a width of the first area is 30% or less of a width of the pattern area.

DETAILED DESCRIPTION OF THE PREFERRED EMBODIMENT

Figure 1:
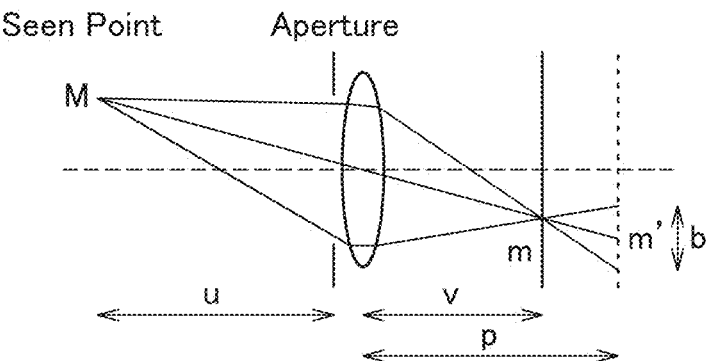
FIG. 1 is an optical model of a lens-based imaging system.

A camera is a means of cropping a 3D image as a 2D image. To recover a 3D image or all-in-focus image from this captured 2D image, it is necessary to know a distance from each imaging point to the center of the lens. FIG. 1 depicts an optical model of a camera with a lens. In FIG. 1, when an object at distance u is measured by a lens with focal length f, all incident light is focused on the plane v by the law of lenses expressed in (Equation 1).

$$1/f = 1/u + 1/v \qquad (1)$$

If the position p of the imaging plane coincides with v, a focused image is obtained, but if it shifts back and forth, as expressed in (Equation 2), the projected light ray is projected as a circle of size b. This circle is sometimes referred to as a confusion circle.

$$b = a|(v - p)|/v \qquad (2)$$

Figure 2:
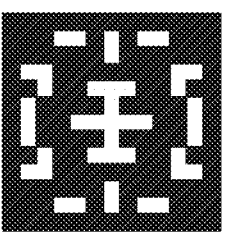
FIG. 2 is an example of an encoding aperture pattern.

In (Equation 2), "a" indicates a size of the aperture. A blur in the image occurs when the size of b exceeds the size of the pixel. Since there is a limit to a depth of field of a camera, an object at a depth far from the focal point will be blurred in the image. The magnitude of this blur depends on the distance from the camera to the object, as expressed in (Equation 1) and (Equation 2). Therefore, by measuring the blur, the distance from the camera to the object can be estimated. This technique is called Depth From Defocus (DFD), and for effective distance measurement using DFD, an encoded aperture pattern has been proposed by, for example, Levin et al., as depicted in FIG. 2.

By the way, an image captured by a camera is an image with various degradation factors added compared to an all-in-focus image (an ideal image with no blur in the entire image). This degradation factor is expressed as a general broken function PSF (Point Spread Function). If the broken function is represented by k, the captured image j captured by the camera can be expressed as a convolution of the all-in-focus image i and the broken function k, as in (Equation 3).

$$j = k * I \qquad (3)$$

In other words, the restoration of the all-in-focus image i can be performed by deconvolution of the captured image j. Since obtaining the all-in-focus image i requires calculating the distance to each imaging point, it can be said that restoring the all-in-focus image is equivalent to restoring the distance from the lens center to the imaging point.

(Equation 4) is the Fourier inverse transform of (Equation 3).

$$J = K \cdot I \qquad (4)$$

If the inverse function of the PSF, $K^{-1}$, is known, the frequency image I of the all-in-focus image can be obtained as expressed in (Equation 5).

$$I = J/K \qquad (5)$$

Then, by inverse transforming I, the all-in-focus image i can be restored. As mentioned earlier, restoring the all-in-focus image i is equivalent to measuring the distance from the lens center to each imaging point of the subject. When an image is captured through an encoded aperture pattern 30, the effect of the encoded aperture pattern 30 is dominant on its broken function PSF (k in equations).

Figure 3:
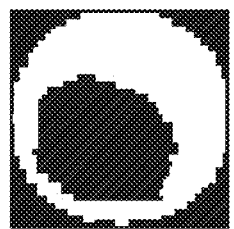
FIG. 3 is another example of an encoding aperture pattern.
Figure 3:
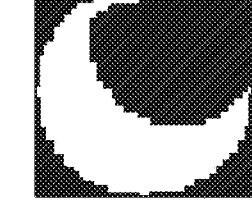

By the way, the broken function k suitable for reproducing an all-in-focus image in general is different from the broken function k suitable for distance measurement using DFD. The broken function is determined by the encoded aperture pattern 30, and Zhou proposes to use a pair of encoded aperture patterns, one is a pattern suitable for distance measurement using DFD and the other is a pattern for reproducing an all-in-focus image, as depicted in FIG. 3.

An imaging system that enables distance measurement using DFD, or reproduction of all-in-focus images using distance data, or reproduction of 3D images, must be able to handle various encoding aperture patterns. In addition, in the case of multiple encoding aperture patterns being used, the configuration must be capable of switching patterns at high speed.

The present invention is to realize a configuration that meets these requirements by using a liquid crystal aperture. This invention realizes a liquid crystal aperture and an imaging device using the liquid crystal aperture that meets such requirements.

Embodiment 1

Figure 4:
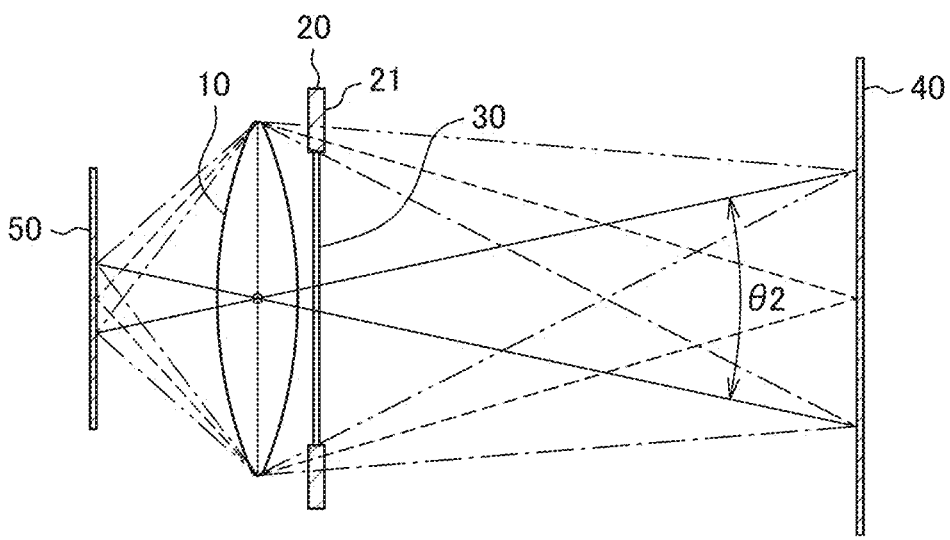
FIG. 4 is a cross-sectional view of an imaging system when an aperture with an encoded aperture pattern is used.

FIG. 4 depicts a cross-sectional view of a case in which a lens 10 is used to capture an image of a photographic target 40. In FIG. 4, the shooting target 40 is on the right side across the lens 10, and an optical sensor 50, from which the image is projected, is on the left side. The shooting objects 40 may hereafter be referred to as the subject 40. However, the subject 40 in this case refers to not only a small object but also a wide object that includes the background surrounding the object. As the optical sensor 50, a semiconductor imaging device such as a complementary metal oxide semiconductor image sensor (CMOS image sensor) or a charge coupled device image sensor (CCD image sensor) is used.

In general, in the lens 10, the refractive index increases as one moves away from the center. Also, spherical aberration increases as one moves away from the center. However, FIG. 4 is a cross-sectional view for illustration, so that the spherical aberration of lens 10 is ignored. The same is true after FIG. 4.

In FIG. 4, light exiting the center of the subject 40, depicted by the dotted line, is refracted at the lens 10 and focused to the center of the optical sensor (hereafter simply referred to as sensor) 50. The light exiting the upper end of the subject 40, which passes through the center of the lens 10, travels straight and forms an image at the lower end of the sensor 50, as depicted by the solid line. Light exiting the upper part of the subject 40, which does not pass through the center of the lens 10, is refracted at the lens 10 and forms an image at the bottom of the sensor 50, as depicted by the two-dot chain line. On the other hand, light that passes through the center of lens 10 and exits the lower part of the subject 40 travels straight and forms an image at the upper end of the sensor 50, as depicted by the solid line. Light exiting the lower part of the subject 40, which does not pass through the center of the lens 10, is refracted at the lens 10 and forms an image at the upper part of the sensor 50, as depicted by the one-pointed chain line.

In FIG. 4, an aperture 20 is placed between the lens and the subject, close to the lens. This aperture has an encoding aperture pattern 30. There is also a second aperture 21 that defines the amount of light passing through it outside of the encoding aperture pattern 30. In this specification, the encoding aperture pattern 30 and the second aperture are referred to as the aperture. By the way, the second aperture 21 is not essential. It is possible to have the outer frame of the encoding aperture pattern 30 play the role of the second aperture 21.

Figure 5:
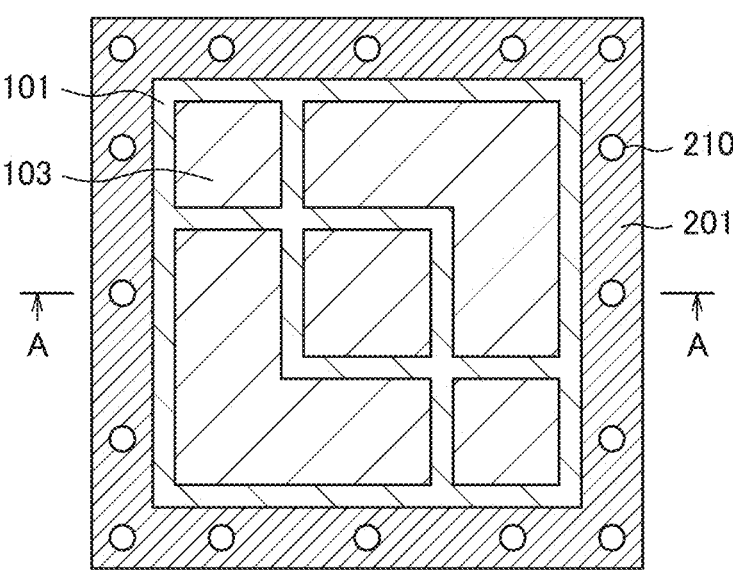
FIG. 5 is an example of an encoding aperture pattern.

FIG. 5 depicts a plan view of a case in which the aperture 20 is configured with a liquid crystal aperture. The liquid crystal aperture is constituted by a thin-film transistor substrate (TFT substrate) on which electrodes, etc., are formed and an opposing substrate on which a light shielding film, etc., are formed, sealed by a sealant in the periphery, and liquid crystal is placed thereinside. In FIG. 5, a light shielding film 201 is formed in the shape of a frame. The light shielding film 201 is manufactured by the same process using the same material as the black matrix used in liquid crystal displays and other devices. The light shielding film 201 is formed on the opposing substrate.

A common electrode is formed in a flat pattern on the opposing substrate. A pixel electrode opposite the common electrode is formed on the TFT substrate. In FIG. 5, a columnar spacer 210 is placed in the frame portion to overlap the light shielding film 201 and to define the distance between the TFT substrate and the opposing substrate.

The encoding aperture pattern 30 is formed inside the frame formed by the light shielding film 201. In FIG. 5, a lower-layer electrode 101 and an upper-layer electrode 103 are formed on the TFT substrate with an insulating film between them to display the encoding aperture pattern 30. The lower-layer electrode 101 and the upper-layer electrode 103 are fixed patterns; this cross-sectional structure on the TFT substrate side is described, for example, in FIG. 17.

Figure 6:
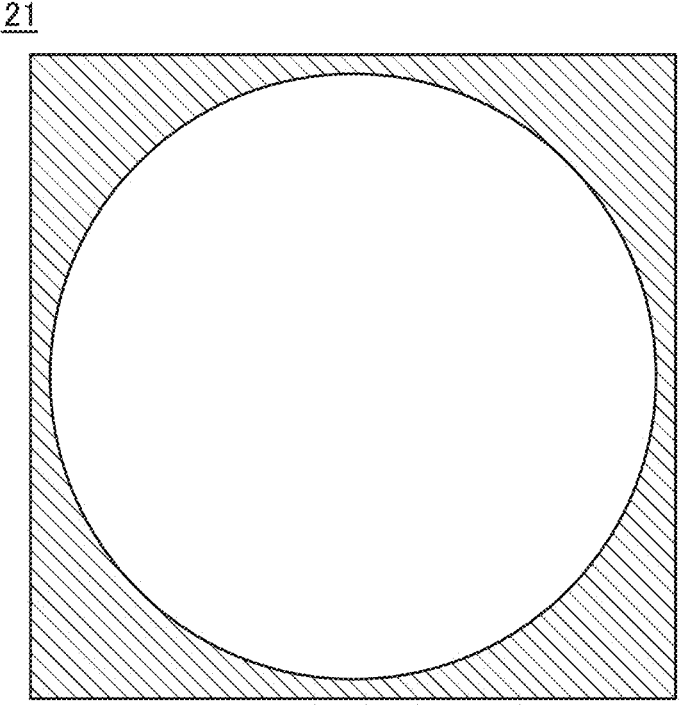
FIG. 6 is an example of an aperture that adjusts the amount of light.

As an aperture that defines the amount of light to be used, a frame formed by a light shielding film can be used as depicted in FIG. 5 as an example. FIG. 6 is a plan view of an example of the aperture 21 to define the amount of light.

Figure 7:
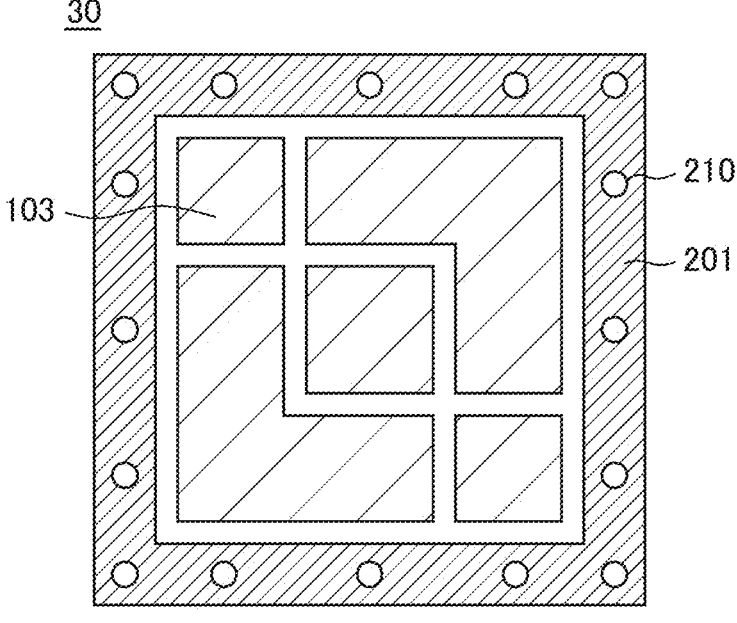
FIG. 7 is a plan view of the shape of an upper layer electrode.

FIG. 7 depicts an example of the encoded aperture patterns 30 formed when only the upper layer electrode 103 is turned on. The example in FIG. 7 is a combination of three rectangles and two L-shapes. In FIG. 7, all five areas are turned on, but by turning off any one or two to four of the patterns, a different encoding aperture pattern 30 can be obtained. To prevent light leakage, the gap formed by the upper layer electrode 103 should be covered by the lower layer electrode 101 in a plan view.

Figure 8:
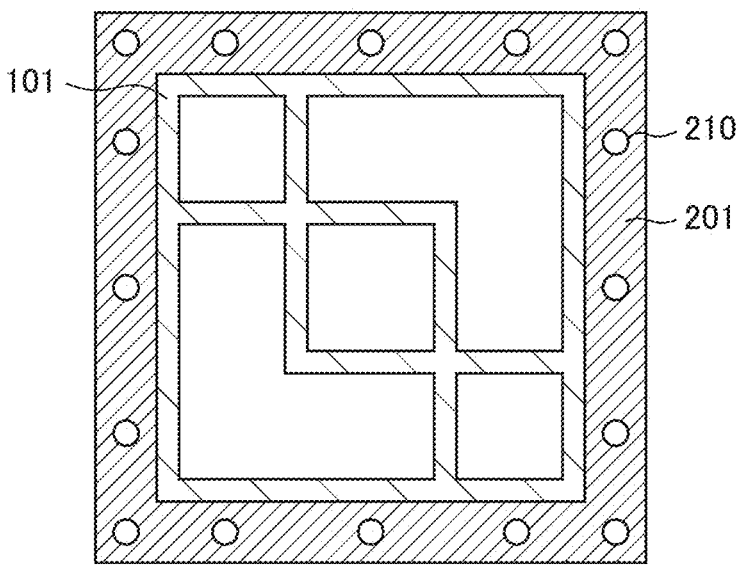
FIG. 8 is a plan view of the shape of a lower layer electrode.

FIG. 8 is an example of the coded aperture pattern 30 formed when only the lower layer electrode 101 is turned on. The example in FIG. 8 corresponds to the pattern gap in FIG. 7. Although the lower layer electrode depicted in FIG. 8 has such a complex pattern, various patterns can be formed by partially and electrically dividing the electrode.

Figure 9:
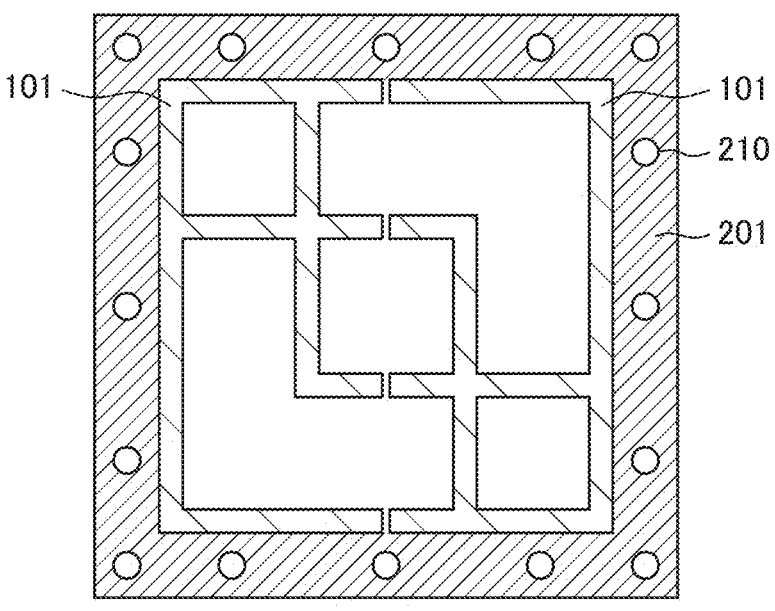
FIG. 9 is a plan view of an example of a divided lower layer electrode.

FIG. 9 depicts an example of the pattern in FIG. 8 divided into left and right sides. By using either pattern, different encoding aperture patterns 30 can be formed. The width of the divided area should be as small as possible, as long as electrical insulation can be maintained. If the width becomes large, there is a risk of light leakage.

The patterns depicted in FIGS. 5, 7, and 9 are mere examples. By freely changing the shape of the upper layer electrode 103 and the lower layer electrode 101, various types of encoded aperture patterns 30 can be formed. However, in order to prevent light leakage, the gap formed by the upper layer electrode 103 should be covered by the lower layer electrode 101 in a plan view.

Figure 10:
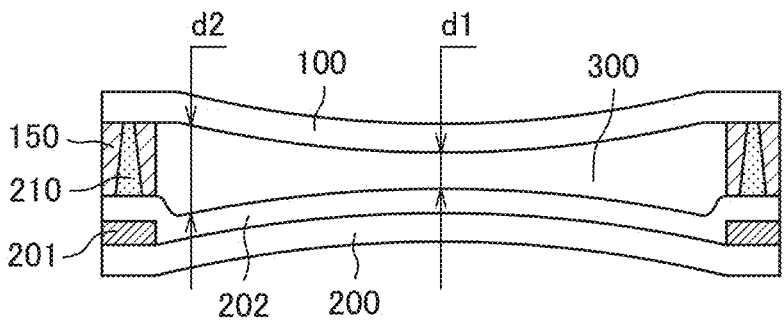
FIG. 10 is an A-A cross-sectional view of FIG. 5, depicting the problems of FIG. 5.

FIG. 10 depicts a cross-sectional view of the problem with the liquid crystal aperture. FIG. 10 corresponds to the A-A cross-sectional view of FIG. 5. In FIG. 10, an opposing substrate 200 is placed on the bottom side and a TFT substrate 100 is placed on the top side. In FIG. 10, the light shielding film 201 is placed around the opposing substrate 200, and an overcoat film 202 by resin is formed over the light shielding film 201. In FIG. 10, in the periphery of the TFT substrate 100 and the opposing substrate 200, the columnar spacer 210 is formed on the opposing substrate 200 to control the distance between the TFT substrate 100 and the opposing substrate 200. In addition, the opposing substrate 200 and the TFT substrate 100 are adhered by a seal material 150 in the periphery, and a liquid crystal 300 is sealed thereinside.

In FIG. 10, there are no columnar spacers in the pattern area. The layer thickness of the liquid crystal at the center, d1, is smaller than that at the periphery, d2. In other words, both the TFT substrate 100 and the counter substrate 200 are convex inwardly toward the center of the patterned area. This shape is necessary to maintain the characteristics of the liquid crystal encapsulation, but the problem is that the size of d1 varies. The d1 is the layer thickness of the liquid crystal layer 300 at the center, so that the variation of d1 means that the layer thickness of the liquid crystal layer 300 varies. If this is the case, the transmittance of the liquid crystal will vary. If the transmittance of the liquid crystal fluctuates, sufficient contrast cannot be maintained, and the reliability of the aperture cannot be ensured.

On the other hand, light leakage occurs in the area where the columnar spacer is placed because the liquid crystal cannot be controlled. In the configuration depicted in FIG. 10, the area where the columnar spacers 210 are placed in the periphery is overlapped with the light shielding film 201 when viewed in a flat plane, so that no light leakage problem occurs.

Figure 11:
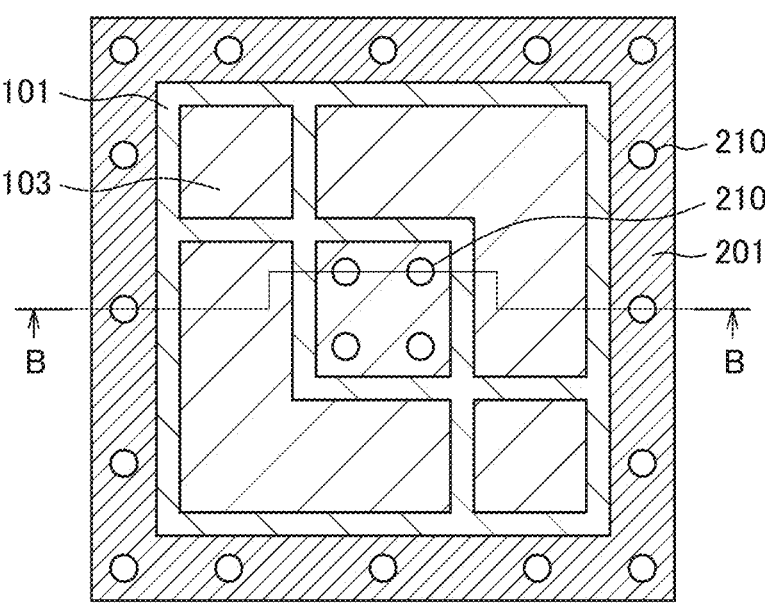
FIG. 11 is a plan view of an encoding aperture pattern of Example 1 of Embodiment 1.

FIG. 11 is a plan view of the first Example of Embodiment 1, which counteracts this problem. The point where FIG. 11 differs from FIG. 5 is that the columnar spacer 210 is placed only in the area overlapping the rectangular upper layer electrode 103 to be placed in the center. By placing the columnar spacer 210 not over the entire pattern area but only in the central area, the contrast of the entire encoding aperture pattern 30 is prevented from deteriorating. On the other hand, placing the columnar spacer 210 in the central region is most effective in preventing fluctuations in the thickness of the liquid crystal layer 300.

Figure 12:
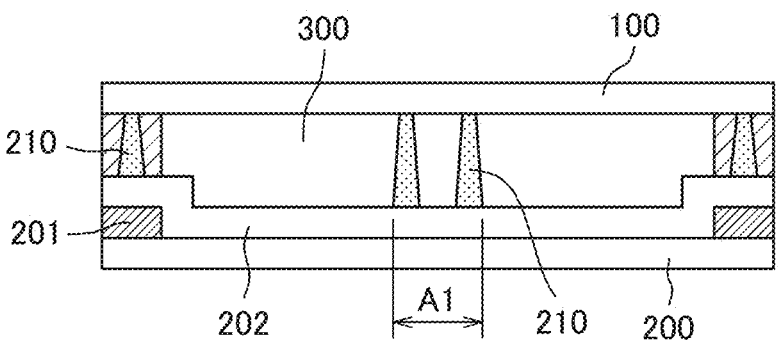
FIG. 12 is a B-B cross-sectional view of FIG. 11.

FIG. 12 is a B-B cross-sectional view of FIG. 11. In FIG. 12, the layer thickness of the liquid crystal layer 300 is almost constant over the entire surface because the columnar spacer 210 is placed in the center of the pattern area. Other configurations in FIG. 12 are similar to those described in FIG. 10. In FIG. 12, the columnar spacer 210 is formed of a transparent material.

In FIG. 12, the central area is affected by light leakage due to the columnar spacer 210. However, the area (A1) where this columnar spacer 210 is placed can be reduced in area. Furthermore, the effect of light leakage due to the columnar spacer 210 can be reduced by making this area a white pattern instead of a black pattern for the shape of the encoding aperture pattern 30.

Figure 13:
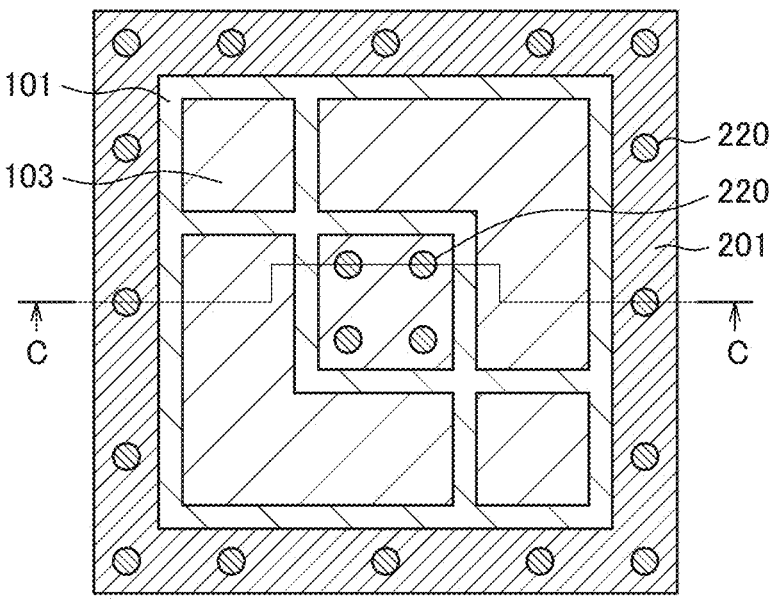
FIG. 13 is a plan view of an encoded aperture pattern of Example 2 of Embodiment 1.

FIG. 13 is a plan view of the second Example of Embodiment 1, which counteracts problems caused by variations in the spacing between the TFT substrate 100 and the opposing substrate 200 in the liquid crystal aperture. FIG. 13 differs from FIG. 11 in that a black columnar spacer 220 is placed in the area overlapping the rectangular upper layer electrode 103 to be placed in the center, instead of the transparent columnar spacer 210. The other configuration is the same as that in FIG. 11.

Figure 14:
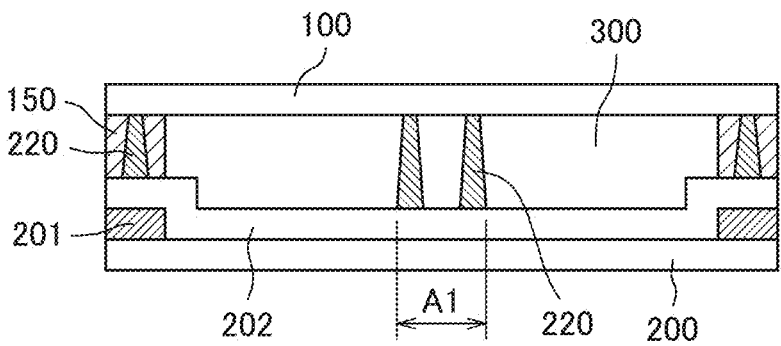
FIG. 14 is a C-C cross-sectional view of FIG. 13.

FIG. 14 is a C-C cross section of FIG. 13. In FIG. 14, the columnar spacer 220 is placed in the center of the pattern area, so that the layer thickness of the liquid crystal layer 300 is approximately same over the front surface. Other configurations in FIG. 14 are also similar to those described in FIG. 10. In FIG. 14, since the columnar spacer 220 is black, there is no effect of light leakage through the spacer itself. The only light leakage is the effect of light distribution disorder due to alignment disorder of liquid crystal molecules around the columnar spacer 220 because of the presence of the columnar spacer 220. Therefore, if the area where the columnar spacer 220 is placed is displayed in black, the effect of light leakage can be reduced compared to the configuration of Example 1.

Figure 15:
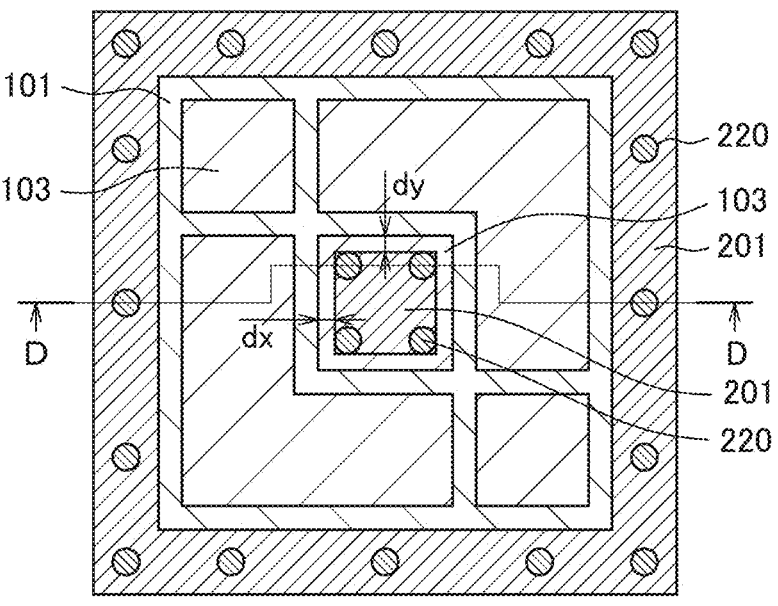
FIG. 15 is a plan view of an encoding aperture pattern of Example 3 of Embodiment 1.

FIG. 15 is a plan view of a third Example of Embodiment 1, which counteracts problems caused by variations in the spacing between the TFT substrate 100 and the opposing substrate 200 in the liquid crystal aperture. The point where FIG. 15 differs from FIG. 13 is that the light shielding film 201 is formed superimposed on the portion of the upper layer electrode 103 in the center where the black columnar spacer 220 is placed. This eliminates light leakage caused by the columnar spacer 220 or 210. However, it is necessary to design the encoding aperture pattern 30 so that the area where the light shielding film 201 is formed is always a black pattern.

In FIG. 15, a black pattern will be displayed on the opposing substrate 200 side, overlapping the upper layer electrode 103 that is formed in the center. In other words, the light shielding film 201 is formed on the opposing substrate 200 and the upper layer electrode 103 is formed on the TFT substrate 100. Therefore, an alignment error occurs when the TFT substrate 100 and the opposing substrate 200 are superimposed. This error should be estimated to be approximately 10 μm. Therefore, when the TFT substrate 100 and the opposing substrate 200 are combined with each other, the diameter of the light shielding film 201 should be designed to be approximately 10 μm smaller than the upper layer electrode 103 on one side in both the vertical and horizontal directions in order to prevent the light shielding film 201 from protruding from the upper layer electrode 103 when viewed in a plane.

In other words, in FIG. 15, the distance dx between the x-direction end of the light shielding film 201 and the x-direction end of the upper layer electrode 103 is 10 μm or more, and the distance dy between the y-direction end of the light shielding film 201 and the y-direction end of the upper layer electrode 103 is 10 μm or more. In other words, the diameter of the light shielding film 201 in the x direction is at least 20 μm smaller than the diameter of the upper layer electrode 103 in the x direction. The diameter of the light shielding film 201 in the y direction is at least 20 μm smaller than the diameter of the upper layer electrode 103 in the y direction. The x-direction can be rephrased as the first direction and the y-direction as the second direction perpendicular to the first direction.

Figure 16:
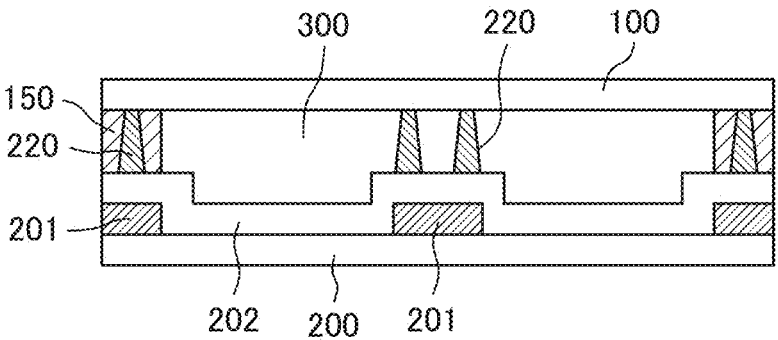
FIG. 16 is a D-D cross-sectional view of FIG. 15.

FIG. 16 is a D-D cross-sectional view of FIG. 15. The difference between FIG. 16 and FIG. 14 of Example 2 is that a light shielding film 201 is formed in the center of the opposing substrate 200. Therefore, in Example 3, light leakage can be completely suppressed in the area where the columnar spacer 220 is placed. Another feature of FIG. 16 is that all of the columnar spacers 220 are arranged in overlap with the light shielding film 201, so that the columnar spacers 220 of the same height can be used for all of them. If all the columnar spacers 220 of the same height are used in FIG. 14, the layer thickness of the liquid crystal, d1, at the center is smaller than the layer thickness, d2, at the periphery by the light shielding film 201.

Figure 17:
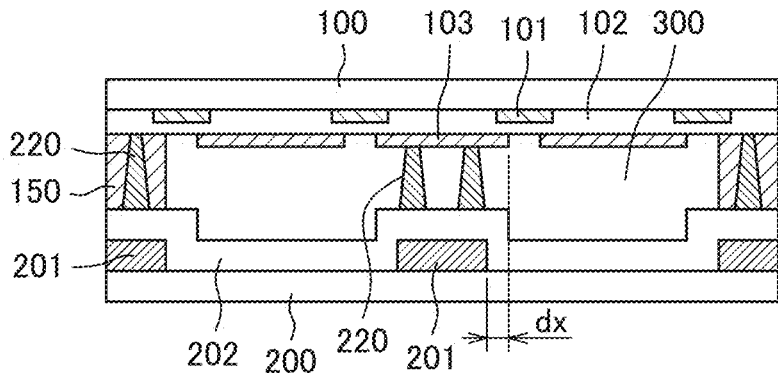
FIG. 17 is a more detailed D-D cross-sectional view of FIG. 15.

FIG. 17 is a detailed cross-sectional view corresponding to the D-D cross-section of FIG. 15. FIG. 17 differs from FIG. 16 in that in FIG. 17, the cross-sectional view of the lower layer electrode 101, an interlayer dielectric insulating film 102, and the upper layer electrode 103 formed on the TFT substrate 100 are described. The cross-sectional configuration of the electrodes in the TFT substrate 100 is the same in Example 1 and Example 2. The common electrode is formed on the opposing substrate 200 in planar form, but is omitted in FIG. 17.

In FIG. 17, the lower layer electrode 101 is formed on the TFT substrate 100. The interlayer insulating film 102 is formed over it, and the upper layer electrode 103 is formed over the interlayer insulating film 102. The upper layer electrode 103 formed in the center of the TFT substrate 100, the columnar spacer 220 formed on the opposing substrate 200, and the light shielding film 201 overlap in a plan view. In FIG. 17, a voltage is applied to the upper layer electrode 103 formed in the center of the TFT substrate 100 such that the display is black. The overlapped light shielding film 201 also displays black, but the edge of the upper layer electrode 103 extends outward by dx on one side more than the edge of the light shielding film 201, in order to absorb the combination error of the TFT substrate 100 and the opposing substrate 200.

In FIGS. 15, 16, and 17, which are Example 3, the black columnar spacer 220 is used as a columnar spacer, but the transparent columnar spacer 210 may also be used.

Embodiment 2

In Embodiment 1, a liquid crystal aperture with a rectangular outer shape is used as the aperture 20. By the way, since the lens is spherical, it is easier to achieve accuracy if the shape of the aperture is a circle or a polygonal shape close to a circle. In the example of Embodiment 1, if the aperture for adjusting the amount of light is made close to a circle, a second aperture for the light shielding frame 21 must be separately prepared.

Figure 18:
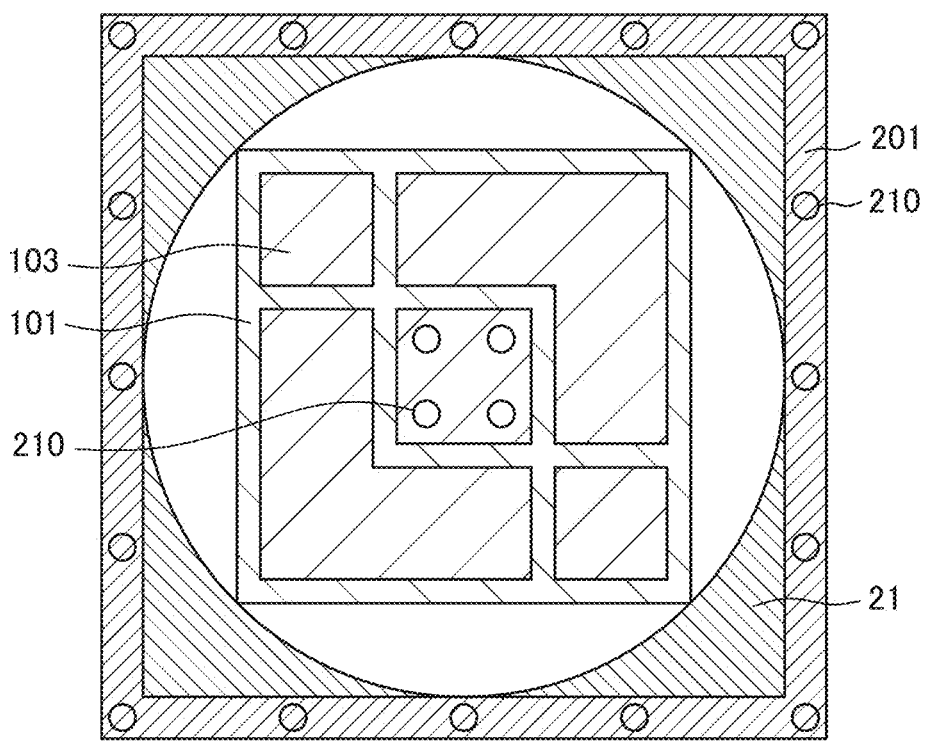
FIG. 18 is a plan view of a liquid crystal aperture in Embodiment 2.

Embodiment 2 is a configuration in which a nearly circular second aperture and the encoding aperture patterns 30 are formed in the same liquid crystal aperture. In FIG. 18, the outer shape of the liquid crystal aperture is rectangular. Then, a sealant and the light shielding film 201 are formed in a frame shape, and a columnar spacer is further arranged. Inside the frame shaped light shieling film 201, a circular light transmission area is formed, which corresponds to the second aperture 21. The encoding aperture pattern 30 is formed in the second aperture 21. The encoding aperture pattern 30 is as described in Embodiment 1. In FIG. 18, the configuration of Example 1 of Embodiment 1 is described.

In FIG. 18, the light shielding frame 21 that defines the circular light transmission area may be formed by the lower layer electrode 101 or the upper layer electrode 103, or by the light shielding film 201. In FIG. 18, the light transmission area defined by the light shielding frame 21 is a circle, but it is not limited to this and may be a pentagon or more polygonal shape if necessary.

Thus, according to Embodiment 2, all necessary configurations of the aperture can be configured with a single liquid crystal aperture.

Embodiment 3

In Embodiment 1, it has been explained that the lower-layer electrode 101 and upper-layer electrode 103, which are fixed patterns, are configured as two layers to form the encoding aperture pattern 30. By dividing the lower-layer electrode 101 and upper-layer electrode 103 into various parts, it is possible to form the encoding aperture pattern 30 in various shapes even with a fixed electrode.

On the other hand, in a liquid crystal display device, pixels are formed in a matrix in the effective area and an image is formed by this. The difference between the liquid crystal display devices and liquid crystal apertures is that in liquid crystal apertures, color images and grayscale are not required, but the shape of the encoded aperture pattern to be formed is small. However, in recent years, with the advancement of high-definition technology, it is possible to manufacture with a pixel pitch of 30 μm or less, and even a pixel pitch of 10 μm has been developed if necessary. If the pixel pitch is high definition with a pixel pitch of 30 μm or less, the matrix structure makes it possible to form even small images such as encoded aperture patterns 30. The pixel pitch of 30 μm or less means that the pixel pitch is 30 μm or less for both the scanning line extension direction and the video signal line extension direction. The following is an example of a case in which the encoding aperture patterns 30 are configured by a liquid crystal aperture in a matrix configuration.

Figure 19:
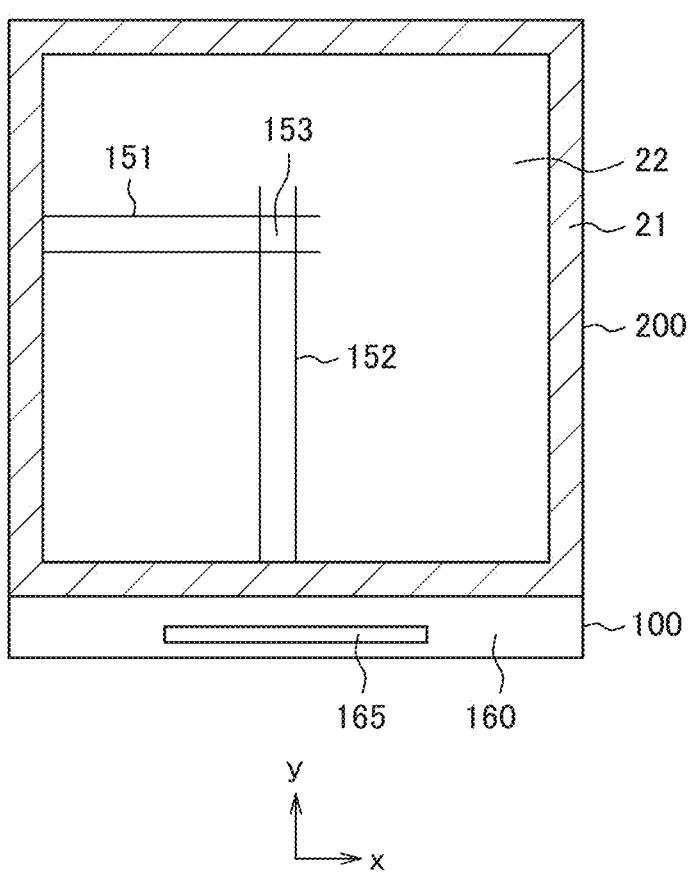
FIG. 19 is a plan view of a liquid crystal aperture in Embodiment 3.

FIG. 19 is a plan view of a liquid crystal aperture. In FIG. 19, the TFT substrate 100 and the opposing substrate 200 are bonded together by a sealant at the periphery, and the liquid crystal is sealed thereinside. Peripheral light shielding areas 21 and pattern areas 22 are formed in the area where the TFT substrate 100 and the opposing substrate 200 overlap.

The TFT substrate 100 is formed larger than the opposing substrate 200, and the portion of the TFT substrate 100 that does not overlap the opposing substrate 200 is a terminal area 160. In the terminal area 160, driver integrated circuits (driver ICs) 165, etc. that drive the liquid crystal aperture are located.

In the pattern area 22 of FIG. 19, the TFT substrate 100 has scanning lines 151 extending in the horizontal direction (the x direction) and arranged in the vertical direction (the y direction). Also, signal lines 152 extend vertically and are arranged in the horizontal direction. A pixel 153 including a pixel electrode is formed in the area surrounded by the scanning lines 151 and signal lines 152. By applying a voltage between the pixel electrode 153 and the common electrode formed on the opposing substrate, the liquid crystal molecules are oriented in the required direction to provide a shutter action against light.

In the area where the TFT substrate 100 and the opposing substrate 200 overlap, a frame-shaped peripheral light shielding area 21 is formed in a periphery of the opposing substrate 200 by a light shielding film (hereinafter also called black matrix). The light shielding area is also formed in the pattern area 22, but the light shielding area formed in the pattern area 22 constitutes liquid crystal aperture, and its position and shape are variable. On the other hand, the frame-shaped light shielding area 21 formed on the opposing substrate 200 is formed by the black matrix, so that its shape is constant.

Figure 20:
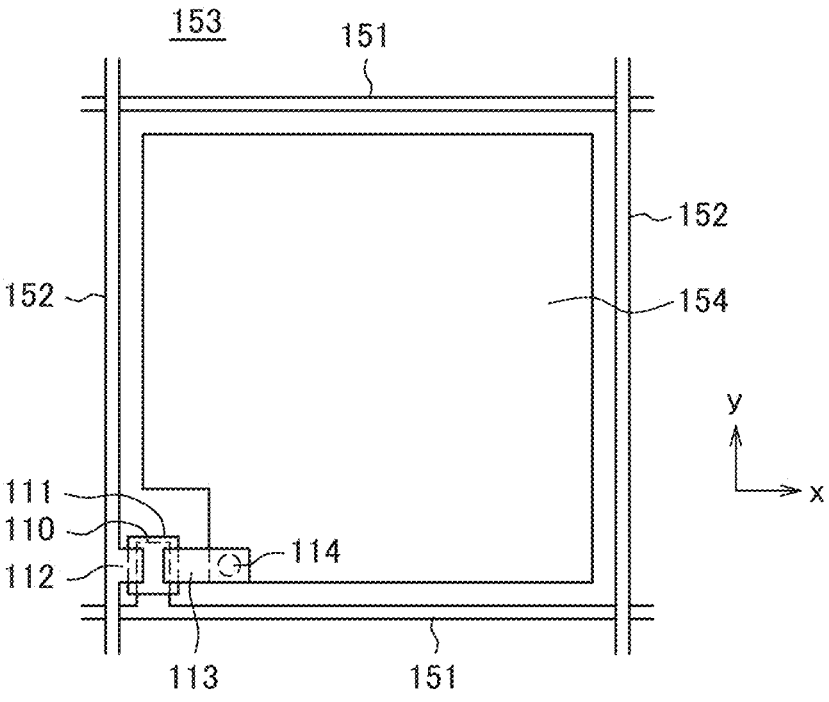
FIG. 20 is a plan view of a pixel in FIG. 19.

FIG. 20 is a plan view of a pixel 153. In FIG. 20, a pixel electrode 154 is formed in the area surrounded by the scanning lines 151 and the signal lines 152. The TFT is formed between the pixel electrode 154 and the signal line 152, which is switched by the scanning signal. The TFT consists of a gate electrode 110 branched from the scanning line 151, a semiconductor film 111, a drain electrode 112 branched from the signal line 153, and a source electrode 113. The source electrode 113 is connected to the pixel electrode 154 through a through-hole 114. A signal is sent to the pixel electrode 154 via the signal line 152; the TFT is made open or close by scanning signal via the scanning line 151 to send the signal to the pixel 153, forming a coded aperture pattern 30.

Figure 21:
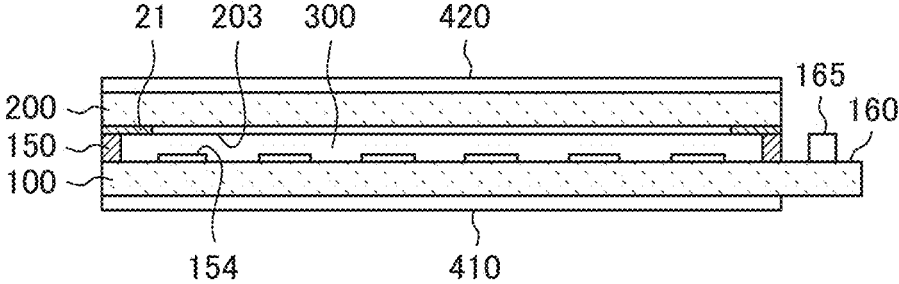
FIG. 21 is a cross-sectional view of the liquid crystal aperture of FIG. 19.

FIG. 21 depicts a cross-sectional view of the liquid crystal aperture. In FIG. 21, the liquid crystal layer 300 is sandwiched between the TFT substrate 100 on which the pixel electrode 154 is formed and the opposing substrate 200 on which a common electrode 203 is formed. The TFT substrate 100 and the opposing substrate 200 are bonded together by the seal material 150. The liquid crystal aperture pixel 153 is formed between the pixel electrode 154 and the common electrode 203.

The frame-shaped light shielding film 21 is formed by the black matrix in a periphery of the opposing substrate 200. The TFT substrate 100 is formed larger than the opposing substrate 200, and the portion of the TFT substrate 100 that does not overlap the opposing substrate 200 is the terminal area 160, in which the driver IC 165 is located. The driver IC 165 is placed in the terminal area 160.

Since liquid crystals can control only polarized light, a first polarizer 410 is attached to the TFT substrate 100 side, and a second polarizer 420 is attached to the opposing substrate 200 side. Therefore, when a liquid crystal aperture is used, there is a loss of light due to the use of polarizing plates.

By the way, in the cross-sectional view in FIG. 21, the columnar spacer 210 is omitted to keep the spacing between the TFT substrate 100 and the opposing substrate 200, i.e., the layer thickness of the liquid crystal, constant. However, if the columnar spacers 210 and 220 are not present in the patterned area, the liquid crystal layer will fluctuate and the contrast will deteriorate, as explained in FIG. 10 of Embodiment 1.

Figure 22:
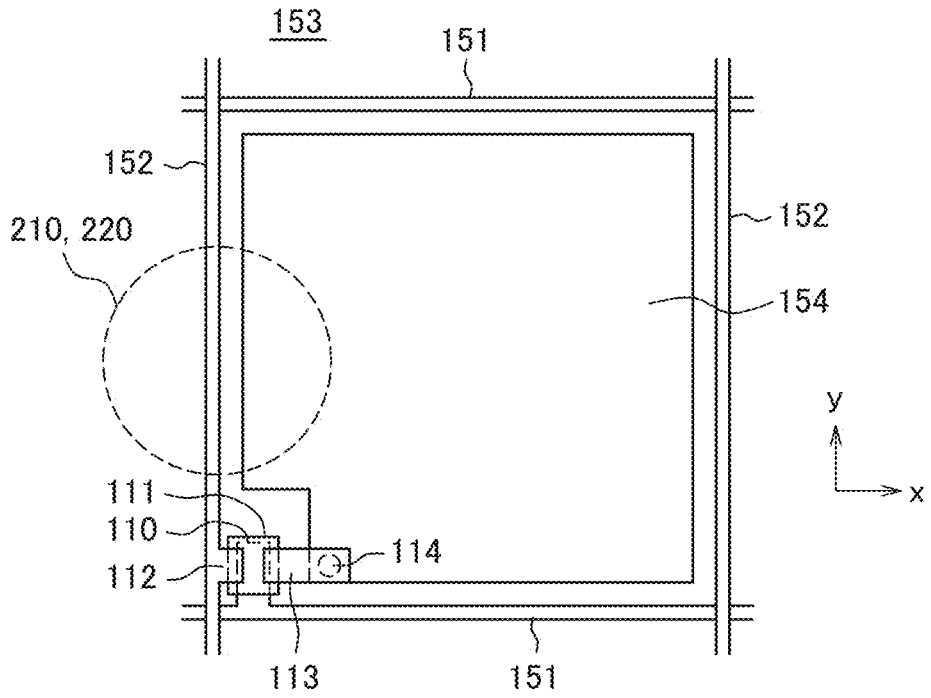
FIG. 22 is another example of the pixel in FIG. 19.

On the other hand, the liquid crystal aperture is very small, with a pixel pitch of 30 μm or less, in order to accommodate small patterns. However, the diameter of the columnar spacers 210 and 220 cannot be proportionally reduced just because the pixel pitch is smaller. If this is done, as depicted in FIG. 22, the ratio of the columnar spacers 210 and 220 to the size of the pixel 153 becomes large, and the transmittance of the pixel is affected, making it impossible to form an accurate pattern.

Figure 23:
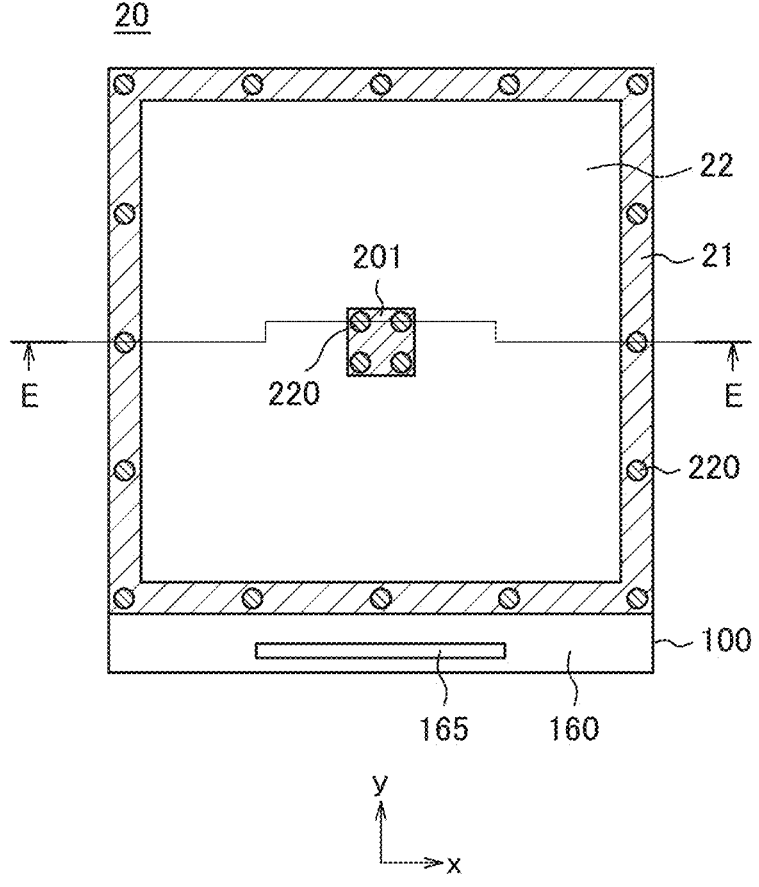
FIG. 23 is another plan view of a liquid crystal aperture in Embodiment 3.

Therefore, as explained in Embodiment 1, the influence of the columnar spacer is reduced by collecting the columnar spacer in the center of the pattern area 22 and designing the pattern so that this area is displayed in black or white. In FIG. 23, the black columnar spacer 220 is used as the columnar spacer, and the light shielding film 201 with black matrix is formed overlapping it. In other words, Example 3 of Embodiment 1 is applied. However, the columnar spacer may be formed of a transparent material.

Figure 24:
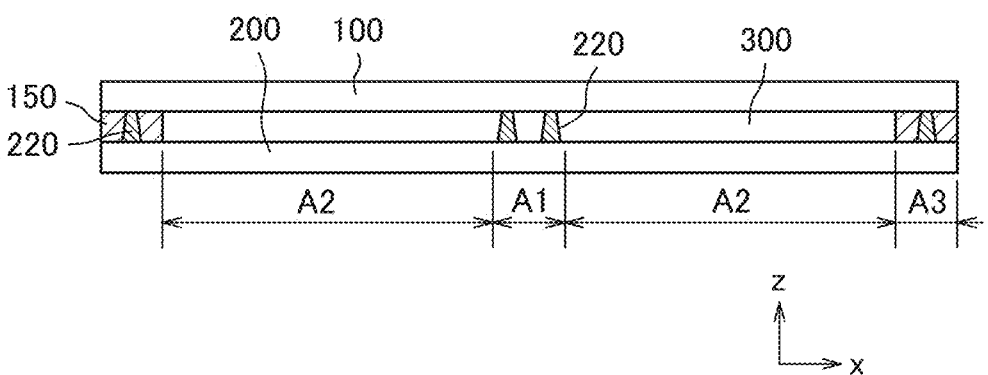
FIG. 24 is an E-E cross-sectional view of FIG. 23.

FIG. 24 depicts the E-E cross section of FIG. 23. In FIG. 24, the TFT substrate 100 and the opposing substrate 200 are bonded together by the seal material 150. And the liquid crystal layer 300 is sandwiched thereinside; the distance between the TFT substrate 100 and the opposing substrate 200 is maintained by the columnar spacers 220 placed in the peripheral seal material 150 and in a narrow area in the center of the pattern area 22.

A3 in FIG. 24 is the width of the seal material 150. In FIG. 24, the columnar spacer 220 may be positioned inside the seal material 150 and very close to the seal material 150. In this case, the outside edge of A2 in FIG. 24 coincides with the location of the columnar spacer very close to the seal material.

In the meantime, if the columnar spacers are distributed all over the pattern area 22, this deteriorates a contrast; therefore, they should be concentrated in a central area of the pattern area as depicted in FIGS. 23 and 24. This central area is A1 in FIG. 24. A size of A1 should be 30% or less of the entire diameter of the opposing substrate (namely, A1+2·A2+2·A3) in the x direction. A relation of the size of the central area with respect to the entire diameter of the opposing substrate in the y direction is the same as that in the x direction.

Figure 25:
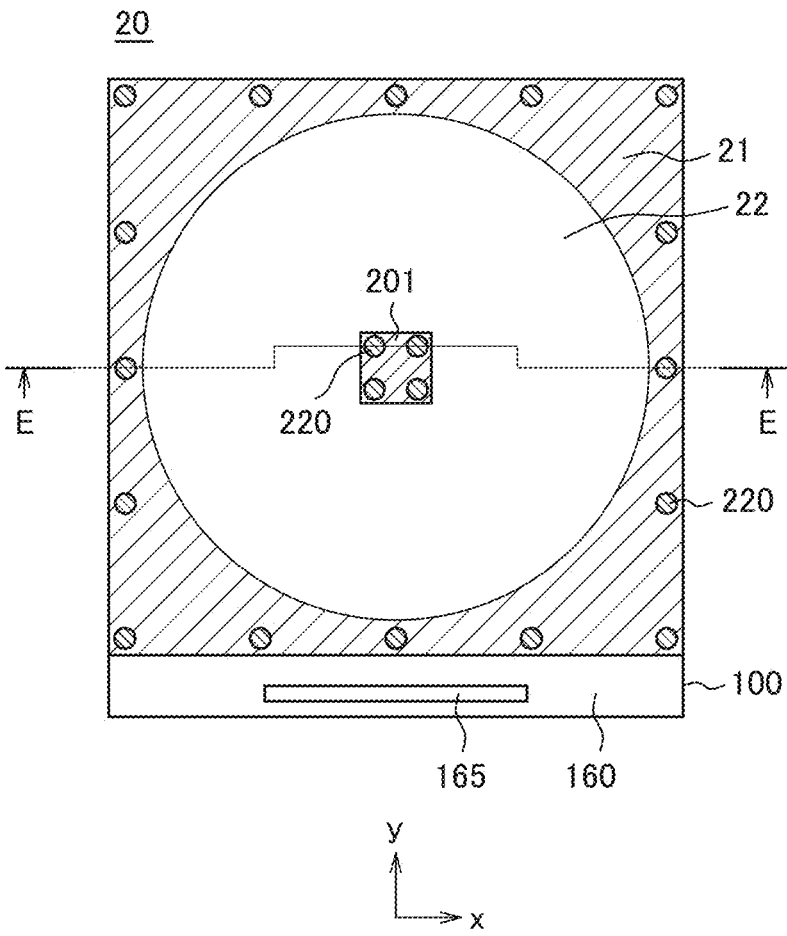
FIG. 25 is a plan view of yet another liquid crystal aperture in Embodiment 3.

An advantage of Example 3 is that the encoding aperture pattern 30 can be easily changed. In addition to the encoding aperture pattern 30, an aperture that defines the amount of light input can be easily formed by a single liquid crystal aperture. FIG. 25 is a plan view of an example of this configuration. In FIG. 25, the outer shape of the liquid crystal aperture is rectangular, but a circular pattern area is formed by the peripheral light shielding film 21. The encoding aperture pattern is formed within the circular pattern area. The pattern area is not limited to a circle, but may be composed of pentagons or more polygons.

Furthermore, instead of the peripheral light shielding film 21, a black display can be used to form an aperture that defines the amount of entering light.

What is claimed is:

1. An imaging device having a lens, an optical sensor that receives light, and an aperture placed close to the lens and placed between the lens and an object to be imaged,
 the aperture being constituted by a liquid crystal aperture in which a liquid crystal layer is sandwiched between a first substrate and a second substrate, a pattern area, and a peripheral light shielding frame,
 a lower layer electrode, an interlayer insulating layer, and an upper layer electrode being formed in this order on the first substrate,
 the upper layer electrode having a first electrode, which is formed in an area which includes a center of the pattern area, and a second electrode disposed from the first electrode with a space,
 wherein the space and the lower layer electrode overlap in a plan view,
 a first light shielding film constituting the peripheral light shielding frame is formed in a periphery of the second substrate, and a first columnar spacer is formed between the first light shielding film and the first substrate in a plan view,
 a second columnar spacer is formed between the first electrode and the second substrate in a plan view.

2. The imaging device according to claim 1, wherein the second columnar spacer is not formed between the upper layer electrode and the second substrate except an area in which the first electrode is formed in a plan view.

3. The imaging device according to claim 1, wherein the second columnar spacer is black.

4. The imaging device according to claim 1, wherein a second light shielding film is formed on the second substrate overlapping the first electrode on the first substrate in a plan view.

5. The imaging device according to claim 4, wherein an outer edge of the second light shieling film is located inside of an outer edge of the first electrode in a plan view.

6. The imaging device according to claim 5, wherein the second columnar spacer overlaps the second light shielding film in a plan view.

7. The imaging device according to claim 1, wherein the first electrode and the second electrode constitute parts of an encoded aperture pattern.

8. The imaging device according to claim 1, wherein the second electrode is divided into a plurality of electrodes.

9. The imaging device according to claim 1, wherein a common electrode is formed on the second substrate, and liquid crystal molecules are driven by electric field formed between the upper layer electrode and the common electrode when a first pattern is formed in the pattern area.

10. The imaging device according to claim 1, wherein a common electrode is formed on the second substrate, and liquid crystal molecules are driven by electric field formed between the lower layer electrode and the common electrode when a second pattern is formed in the pattern area.

11. An imaging device having a lens, an optical sensor that receives light, and an aperture placed close to the lens and placed between the lens and an object to be imaged, an outer shape of the aperture being rectangular, the aperture being constituted by a liquid crystal aperture in which a liquid crystal layer is sandwiched between a first substrate and a second substrate, a pattern area, and a peripheral light shielding frame, wherein the pattern area is a pentagon or larger polygon or circle, in the pattern area, scanning lines extend in a first direction and are arranged in a second direction, video signal lines extend in the second direction and are arranged in the first direction, a pixel is formed in a region surrounded by the scanning lines and the video signal lines, a pitch of the pixel in the first direction is 30 µm or less, and a pitch of the pixel in the second direction is 30 µm or less, in the pattern area, a columnar spacer, which determines a distance between the first substrate and the second substrate, is formed in a first area which includes a center of the pattern area, and in the first direction, a width of the first area is 30% or less of a width of the pattern area.

12. The imaging device according to claim 11, wherein in the second direction, a width of the first area is 30 or less of a width of the pattern area.

* * * * *